(12) United States Patent
Chung

(10) Patent No.: US 12,606,386 B2
(45) Date of Patent: Apr. 21, 2026

(54) SECONDARY BATTERY ELECTRODE PRODUCTION SYSTEM

(71) Applicant: YOUIL ENERGY TECH. CO., LTD, Gyeonggi-do (KR)

(72) Inventor: Youn Gil Chung, Gyeonggi-do (KR)

(73) Assignee: YOUIL ENERGY TECH.CO., LTD, Gyeonggi-do (KR)

( * ) Notice: Subject to any disclaimer, the term of this patent is extended or adjusted under 35 U.S.C. 154(b) by 315 days.

(21) Appl. No.: 18/685,647

(22) PCT Filed: Jan. 17, 2024

(86) PCT No.: PCT/KR2024/000803
§ 371 (c)(1),
(2) Date: Feb. 22, 2024

(87) PCT Pub. No.: WO2025/116125
PCT Pub. Date: Jun. 5, 2025

(65) Prior Publication Data
US 2025/0243011 A1 Jul. 31, 2025

(30) Foreign Application Priority Data
Nov. 30, 2023 (KR) ........................ 10-2023-0170902

(51) Int. Cl.
*B65G 47/91* (2006.01)
(52) U.S. Cl.
CPC ................................... *B65G 47/91* (2013.01)
(58) Field of Classification Search
CPC .............................. B65H 29/241; B65H 29/32
See application file for complete search history.

(56) References Cited

FOREIGN PATENT DOCUMENTS

| | | | | |
|---|---|---|---|---|
| JP | 2007-180095 A | 7/2007 | | |
| KR | 10-2015-0089803 A | 8/2015 | | |
| KR | 10-2019-0102919 A | 9/2019 | | |
| KR | 10-2021-0152230 A | 12/2021 | | |
| KR | 10-2021-0152346 A | 12/2021 | | |
| KR | 20210152230 A | * 12/2021 | ............. | H01M 4/04 |
| KR | 10-2023-0101723 A | 7/2023 | | |

OTHER PUBLICATIONS

English translation KR20210152230 (Year: 2021).*
International Search Report from corresponding PCT Application No. PCT/KR2024/000803, dated Aug. 27, 2024.

* cited by examiner

*Primary Examiner* — Jason L Vaughan
*Assistant Examiner* — Amanda Kreiling
(74) *Attorney, Agent, or Firm* — Harness, Dickey & Pierce, P.L.C.

(57) ABSTRACT

A secondary battery electrode production system comprises a transfer portion configured to transfer an electrode, wherein the transfer portion is divided into a first area for unloading the electrode and a second area for loading or holding the electrode, the transfer portion comprises a suction driving portion, a suction plate, a belt moving along the suction plate, and a plurality of suction blocks coupled to the belt, the suction plate comprises a plurality of first flow paths partitioned from each other, each of the suction blocks comprises a second flow path and a first hole connected to the second flow path, the belt comprises a second hole aligned with the first hole, and among the plurality of suction blocks, the first hole of the suction block positioned in the first area communicates with any one of the plurality of first flow paths.

10 Claims, 14 Drawing Sheets

SECONDARY BATTERY ELECTRODE PRODUCTION SYSTEM

CROSS-REFERENCE TO RELATED APPLICATIONS

This application is a national phase application of PCT International Application No. PCT/KR2024/000803, filed on Jan. 17, 2024, which claims priority to Korean Patent Application No. 10-2023-0170902, filed on Nov. 30, 2023. The entire disclosure of the applications identified in this paragraph is incorporated herein by references.

TECHNICAL FIELD

The present invention relates to a secondary battery electrode production system.

BACKGROUND ART

In general, a chemical battery refers to a battery composed of a positive electrode, a negative electrode, and an electrolyte to thus generate electrical energy using a chemical reaction, and is classified into a primary battery, which is disposable, and a secondary battery, which is chargeable and dischargeable, thus enabling repeated use.

The use of a secondary battery is gradually increasing due to the advantage of its chargeable and dischargeable characteristic. [fuzzy] Among such secondary batteries, a lithium secondary battery has high energy density per unit weight, and thus is widely used as a power source in electronic communication devices and in high-power hybrid vehicles.

Electrodes used in such a secondary battery are used as positive and negative electrodes of the battery, and are used to electrically connect the battery to the outside of the battery.

Electrode tabs may be formed on an electrode by performing notching at regular intervals.

The notched electrode is sealed in the form of a pouch or a rectangular or cylindrical can through a stacking process and is manufactured into a secondary battery.

An electrode material wound in the form of a reel is unwound from an unwinding portion and fed into a notching portion. Subsequently, a plurality of electrode tabs are continuously formed at regular intervals on the electrode material. Electrodes with tabs formed may be rewound in the form of a reel or cut into a specific size, and then transferred through a transfer portion and loaded into a magazine.

The transfer portion includes a belt with a plurality of suction holes formed therein and a belt driving portion for moving the belt. Electrodes with tabs formed are held in place on the belt by suction and transferred toward the magazine. At this time, the belt is positioned above the electrodes, and due to the suction force, the electrodes are not detached and are transferred to the point where the magazine is located.

Before the electrodes reach the magazine, they are inspected to determine whether they are defective or not. Only the acceptable electrodes are transferred toward the magazine, while the defective ones may be separated from the belt via a separate pusher portion and dropped.

However, when the defective electrodes are separated from the belt, there is a problem of reduced suction force on the belt due to the opening of the suction holes that are holding the defective electrodes and the influx of air through the opened suction holes. In both cases where the suction is released or the suction is maintained without being released at the time of separation of defective electrodes from the belt, the suction holes that are holding the defective electrodes are open, inevitably weakening the suction force of the belt. Consequently, weakened suction force may lead to the electrodes detaching from the belt.

When dropping defective electrodes, even if the suction is switched off and then back on, there is an issue of electrodes falling from the belt before maintaining the suction to catch them due to the fast movement speed of the belt.

DETAILED DESCRIPTION OF THE INVENTION

Technical Problem

An object of the present invention is to provide a secondary battery electrode production system capable of preventing an electrode from detaching from a belt due to insufficient suction force, by maintaining a suction status of an adjacent electrode even when suction holes holding a defective electrode are open when dropping the defective electrode.

Technical Solution

According to an embodiment, there is provided a secondary battery electrode production system including a transfer portion configured to transfer an electrode, wherein the transfer portion is divided into a first area for unloading the electrode and a second area for loading or holding the electrode, the transfer portion comprises a suction driving portion, a suction plate, a belt moving along the suction plate, and a plurality of suction blocks coupled to the belt, the suction plate comprises a plurality of first flow paths partitioned from each other, each of the suction blocks comprises a second flow path and a first hole connected to the second flow path, the belt comprises a second hole aligned with the first hole, and among the plurality of suction blocks, the first hole of the suction block positioned in the first area communicates with any one of the plurality of first flow paths, while the first hole of the suction block positioned in the second area communicates with another one of the plurality of first flow paths.

The first flow paths may be arranged into a plurality of columns, and the first hole of the suction block positioned in the first area and the first hole of the suction block positioned in the second area are aligned and disposed in different columns of the first flow paths.

The suction block may include a block body including the second flow path and the first hole, and a suction tip coupled to the block body and in contact with the electrode by communicating with the second flow path.

The first flow paths may be arranged into a plurality of columns, the suction plate may include an inlet connected to the suction driving portion, and the inlet may be disposed in alignment with the columns.

The transfer portion may include, along a moving direction of the electrode, a loading area for loading the electrode, a first inspection area for performing primary inspection on the electrode loaded in the loading area, and a first unloading area for discharging an electrode that has been determined to be defective in the first inspection area, wherein the first area may correspond to the first unloading area and the second area may correspond to the loading area and the first inspection area.

The transfer portion may include a second inspection area for performing secondary inspection on an electrode that is not discharged from the first unloading area and a second unloading area for loading the electrode inspected in the second inspection area into a magazine, wherein the first area may correspond to the second unloading area and the second area may correspond to the second inspection area.

The first flow paths may be arranged into a plurality of columns, and the suction driving portion may include a plurality of suction units that communicate, respectively, with the first flow paths disposed in the plurality of columns.

The suction driving portion may sequentially release suction of the plurality of suction units in the first area.

The suction plate may include a first protrusion protruding from a lower surface, and the first flow path may be disposed on the first protrusion and be opened from the first protrusion toward the belt.

The belt may include a second groove in which the second hole is disposed, the first protrusion may be disposed in the second groove, and the second groove may be disposed along the first flow path.

Advantageous Effects

According to an embodiment, when unloading a defective electrode, even when suction holes that are holding electrodes are opened, the suction status of an adjacent electrode is maintained, thereby preventing the electrodes from detaching from a belt due to insufficient suction force.

MODE FOR INVENTION

Hereinafter, preferred embodiments of the present invention will be described in detail with reference to the accompanying drawings.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the present invention are described herein with reference to drawings that are schematic illustrations of idealized embodiments of the invention. As such, variations from the shapes of the drawings as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

A secondary battery electrode production system is a device for automatically and continuously producing electrodes used in secondary batteries.

Figure 1:
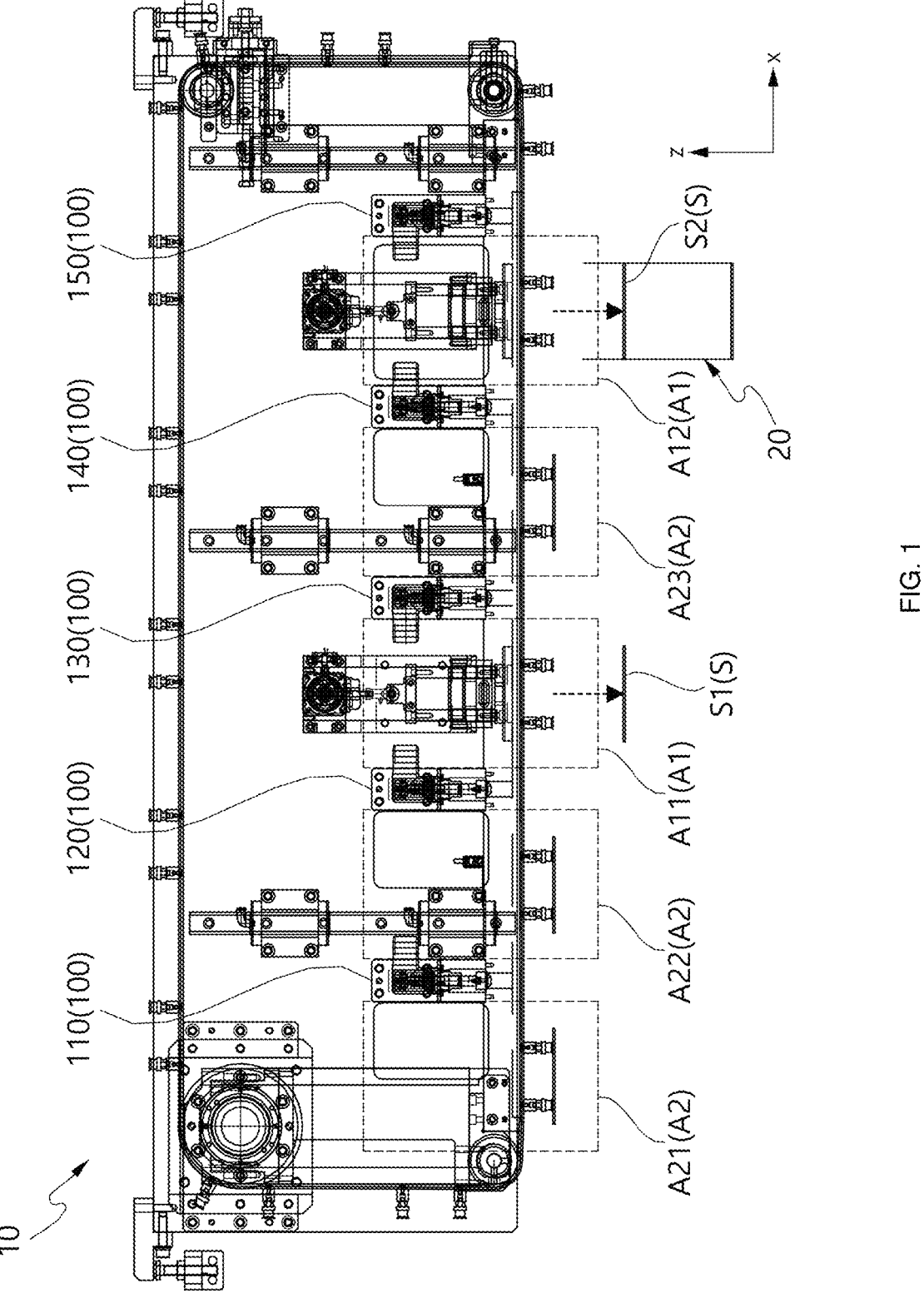
FIG. 1 is a schematic view showing a transfer portion of a secondary battery electrode production system according to an embodiment.
Figure 2:
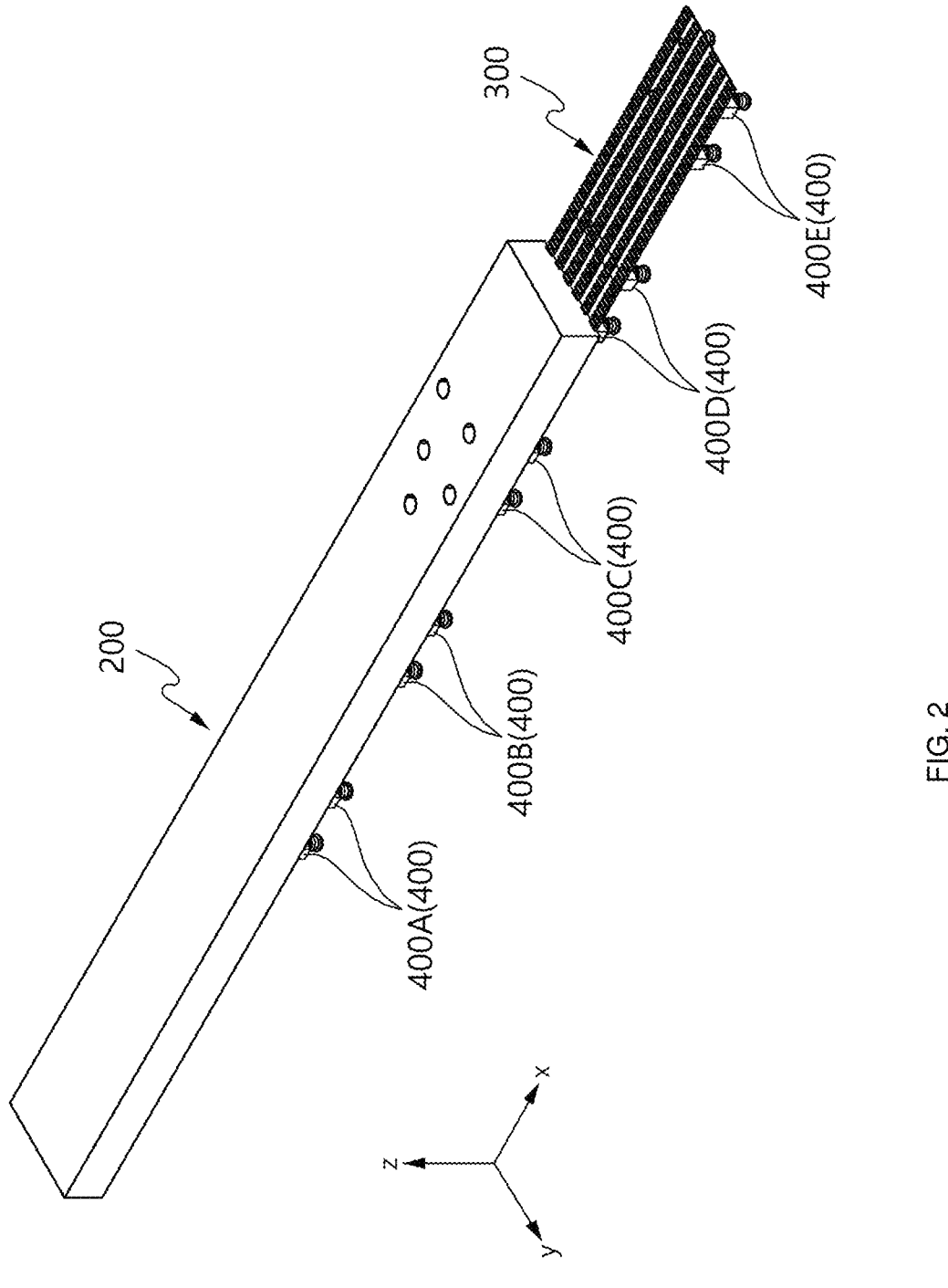
FIG. 2 is a view showing a suction plate, a belt, and a suction block of the transfer portion shown in FIG. 1.
Figure 3:
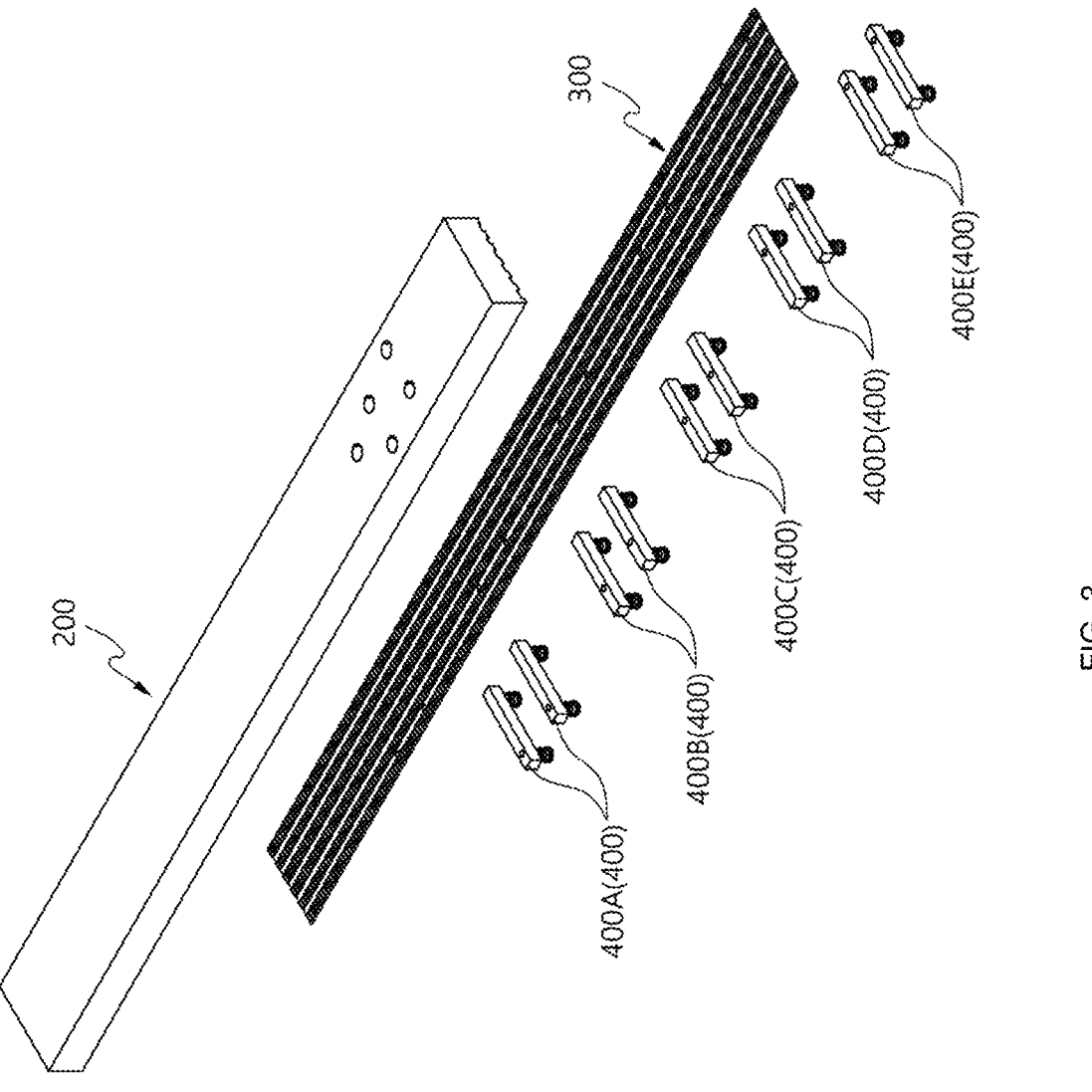
FIG. 3 is an exploded view of the suction plate, belt, and suction block of the transfer portion shown in FIG. 1.

FIG. 1 is a schematic view showing a transfer portion 10 of a secondary battery electrode production system according to an embodiment, FIG. 2 is a view showing a suction plate 200, a belt 300, and a suction block 400 of the transfer portion shown in FIG. 1, and FIG. 3 is an exploded view of the suction plate 200, belt 300, and suction block 400 of the transfer portion 10 shown in FIG. 1.

Hereinafter, in the drawings, the x-axis direction represents a direction between the front and rear of the secondary battery electrode production system, the y-axis direction represents a direction between the left and right sides of the secondary battery electrode production system and represents the width direction of an electrode. The z-axis direction in the drawings represents the direction between the top and bottom of the secondary battery electrode production system. In describing embodiments, the terms "front" and "rear" used herein are defined based on the transfer direction of an electrode, and terms "upper side" and "lower side" used herein are defined based on a vertical direction.

An electrode is supplied from an unwinding portion to a notching portion and electrode tabs are formed in the notching portion. The electrodes in the form of sheets with electrode tabs formed are loaded into a transfer portion 10 and transferred toward a magazine.

The transfer portion 10 may include a suction driving portion 100, a suction plate 200, a belt 300 moving along the suction plate 200, and a plurality of suction blocks 400 coupled to the belt 300.

The transfer portion 10, with respect to the x-axis direction in the drawing, may sequentially be divided into a loading area A21, a first inspection area A22, a first unloading area A11, a second inspection area A23, and a second unloading area A12.

The loading area A21 holds the electrodes in the form of sheets and loads them into the suction blocks 400.

The first inspection area A22 inspects defects of the electrodes S loaded in the loading area A21.

The first unloading area A11 discharges an electrode S determined to be defective in the first inspection area A22. In the first unloading area A11, the electrode S determined to be defective may be discharged using a pusher device to push it out. Alternatively, the electrode S determined to be defective may be discharged simply by releasing the suction. Alternatively, the electrode S determined to be defective may be discharged using both the suction and the pusher device. The electrode S determined to be defective may be loaded in a separate box or magazine.

The second inspection area A23 conducts inspections on electrodes S that are acceptable and have not been discharged from the first unloading area A11.

The second unloading area A12 discharges the electrodes S that have passed through the second inspection area A23 toward the magazine 20. Acceptable electrodes S are loaded into the magazine.

Hereinafter, a first area, where the electrodes S are discharged, is defined as an area where the electrodes S are separated from the suction blocks 400 and the suction blocks 400 are open. The first area A1 corresponds to the first unloading area A11 and the second unloading area A12.

Hereinafter, a second area A2, where suction on the electrodes S is maintained, is defined as an area where the suction blocks 400 are not open. The second area A2 corresponds to the loading area A21, the first inspection area A22, and the second inspection area A23.

The suction plate 200 is elongated along the front-and-rear direction x. The belt 300 is arranged to move along the suction plate 200. Additionally, the belt 300 may be arranged to circulate through a motor.

Part of the belt 300 is located on the underside of the suction plate 200. The suction blocks 400 are coupled to the underside of the belt 300. The electrode S is positioned on the underside of the suction block 400. The electrode S is transferred by being held by the suction block 400.

The suction plate 200 is connected to the suction driving portion 100 to provide suction force to the electrodes S.

The suction driving portion 100 includes a plurality of suction units 110,120,130,140, and 150. A first suction unit 110 may be connected to the loading area A21. A second suction unit 120 may be connected to the first inspection area A22. A third suction unit 130 may be connected to the first unloading area A11. A fourth suction unit 140 may be connected to the second inspection area A23. A fifth suction unit 150 may be disposed in the second unloading area A12.

The suction driving portion 100 may independently control the first suction unit 110, the second suction unit 120, the third suction unit 130, the fourth suction unit 140, and the fifth suction unit 150.

A pair of suction blocks 400 may hold one electrode S each. The suction blocks 400 may be aligned and arranged in the loading area A21, the first inspection area A22, the first unloading area A11, the second inspection area A23, and the second unloading area A12, respectively.

Figure 4:
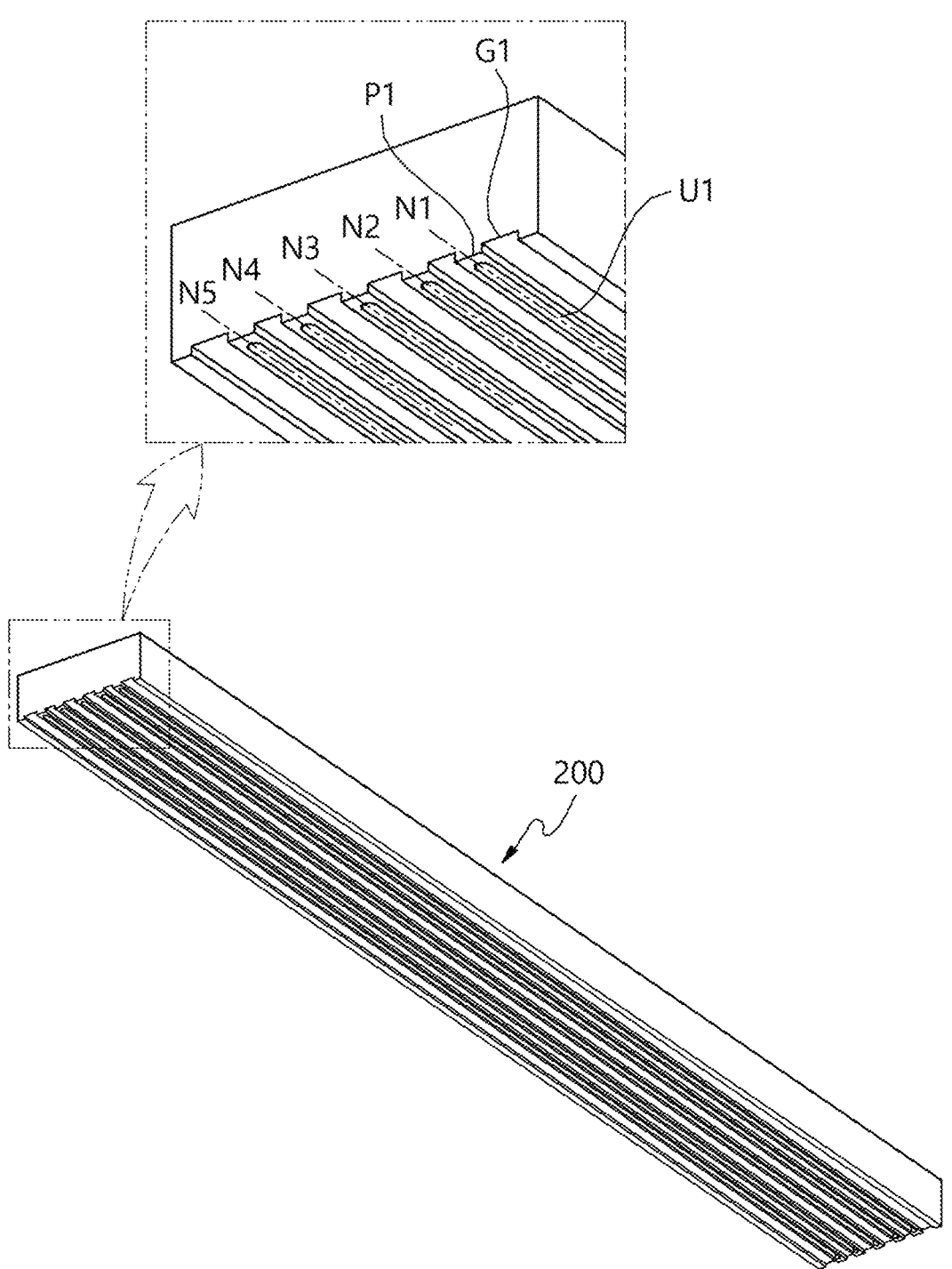
FIG. 4 is a view showing the suction plate.

FIG. 4 is a view showing the suction plate 200.

Referring to FIG. 4, the suction plate 200 includes a plurality of first protrusions P1 protruding from the lower surface. The first protrusions P1 extend along the front-and-rear direction x. Additionally, the suction plate 200 includes a first flow path U1. The first flow path U1 is located in the first protrusion P1. The first protrusions P1 increase adhesion with the belt 300 and prevent air leakage between the belt 300 and the suction plate 200.

The plurality of first protrusions P1 are spaced apart at regular intervals. A first groove G1 is located between each pair of first protrusions P1. The first groove G1 extends along the front-and-rear direction x.

A plurality of first flow paths U1 are arranged into a plurality of columns N1, N2, N3, N4, and N5. For example, the first flow paths U1 may be arranged into five columns N1, N2, N3, N4, and N5. Five first flow paths U1 may be arranged respectively along the five columns N1, N2, N3, N4, and N5. The five first flow paths U1 are partitioned and formed independently of each other.

Depending on the required processes of the facility, the number of processes is determined, and accordingly, the quantity of the first flow paths U1 is determined to be equal to the number of processes.

The transfer unit 10 passes through five areas, including the loading area A21, the first inspection area A22, the first unloading area A11, the second inspection area A23, and the second unloading area A12. Accordingly, five first flow paths U1 may also correspondingly be arranged.

Figure 5:
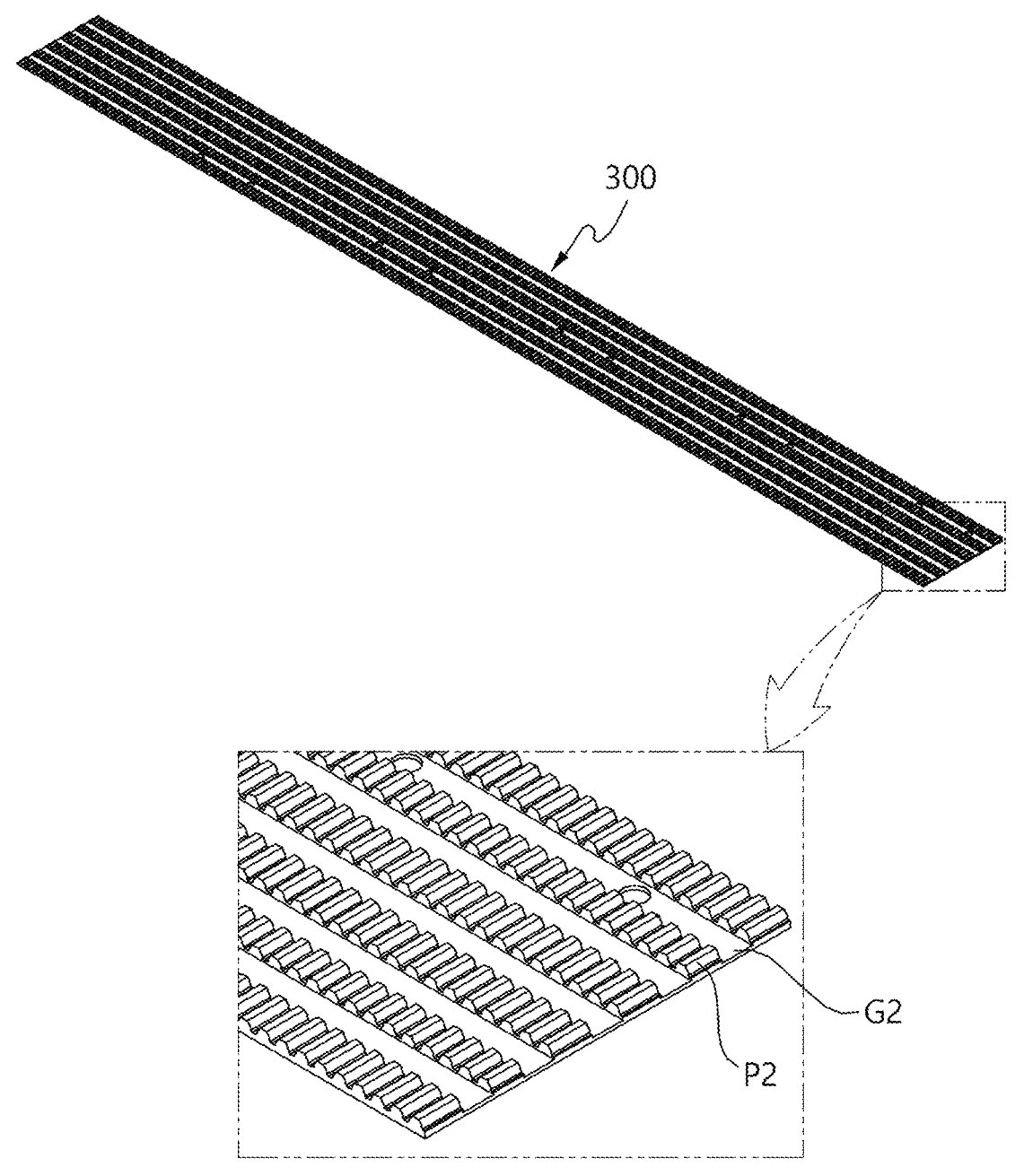
FIG. 5 is a view showing the belt.

FIG. 5 is a view showing the belt 300.

Referring to FIG. 5, the upper surface of the belt 300 is in contact with the lower surface of the suction plate 200.

The belt 300 may include second protrusions P2. The second protrusions P2 are formed by protruding from the upper surface of the belt 300, facing the suction plate 200. The second protrusions P2 extend along the front-and-rear direction x. The second protrusions P2 may have an uneven structure to enhance contact with the suction plate 200.

The belt 300 may include second grooves G2. The second groove G2 is located between each pair of second protrusions P2. The second grooves G2 are formed with a concave shape on the upper surface of the belt 300, facing the suction plate 200. The second grooves G2 extend along the front-and-rear direction x.

Figure 6:
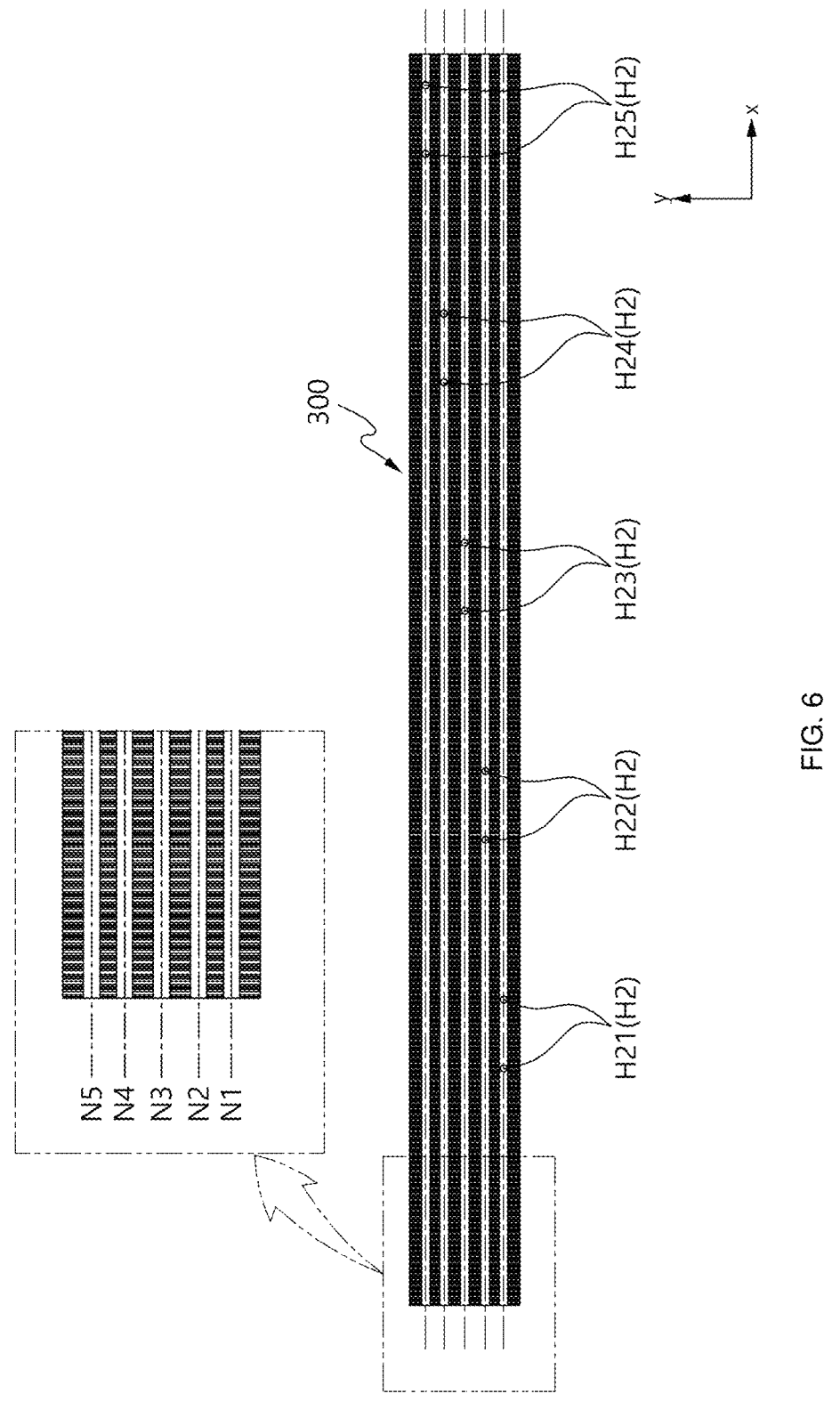
FIG. 6 is a view showing a second hole of the belt.

FIG. 6 is a view showing second holes H2 of the belt 300.

Referring to FIG. 6, the belt 300 includes a plurality of second holes H2. The second holes H2 serve to connect the suction plate 200 and the suction blocks 400 to each other. The second holes H2 may include a 2-1st hole, a 2-2nd hole H22, a 2-3rd hole H23, a 2-4th hole H24, and a 2-5th hole H25. The 2-1st hole H21 may be disposed in the first column N1. The 2-2nd hole H22 may be disposed in the second column N2. The 2-3rd hole H23 may be disposed in the third column N3. The 2-4th hole H24 may be disposed in the fourth column N4. The 2-5th hole H25 may be disposed in the fifth column N5.

The 2-1st hole H21 communicates with the first flow path U1 positioned corresponding to the first column N1. The 2-2nd hole H22 communicates with the first flow path U1 positioned corresponding to the second column N2. The 2-3rd hole H23 communicates with the first flow path U1 positioned corresponding to the third column N3. The 2-4th hole H24 communicates with the first flow path U1 positioned corresponding to the fourth column N4. The 2-5th hole H25 communicates with the first flow path U1 positioned corresponding to the fifth column N5.

Figure 7:
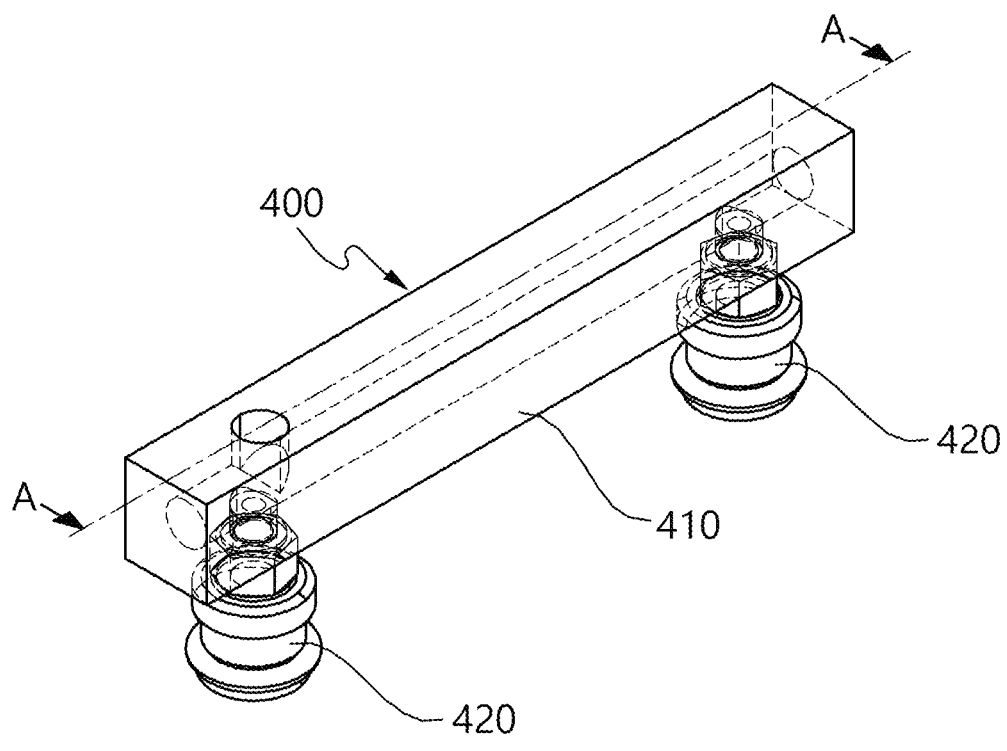
FIG. 7 is a view showing the suction block.
Figure 8:
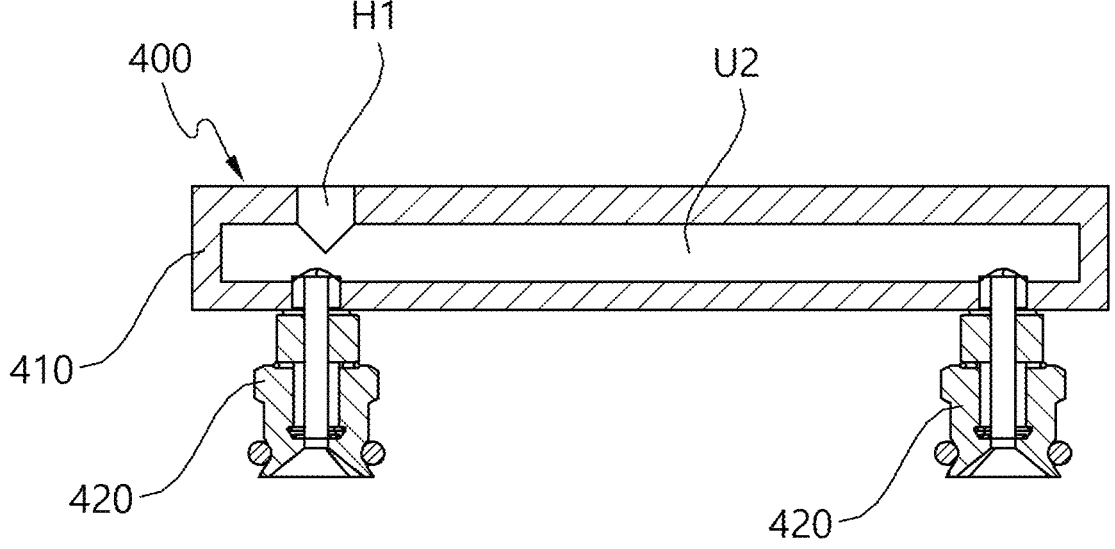
FIG. 8 is a side cross-sectional view of the suction block taken along line A-A in FIG. 7.

FIG. 7 is a view showing the suction block 400, and FIG. 8 is a side cross-sectional view of the suction block 400 taken along line A-A in FIG. 7.

Referring to FIG. 7, the suction block 400 may include a block body 410 and suction tips 420. The block body 410 includes the second flow path U2 and the first hole H1. The second flow path U2 is positioned inside the block body 410. The first hole H1 connects the second flow path U2 and the outside to each other.

The block body 410 may have a cuboid shape. The suction tips 420 may be positioned on one side and the opposite side of the block body 410, respectively. The suction tips 420 make contact with the electrode S.

Figure 9:
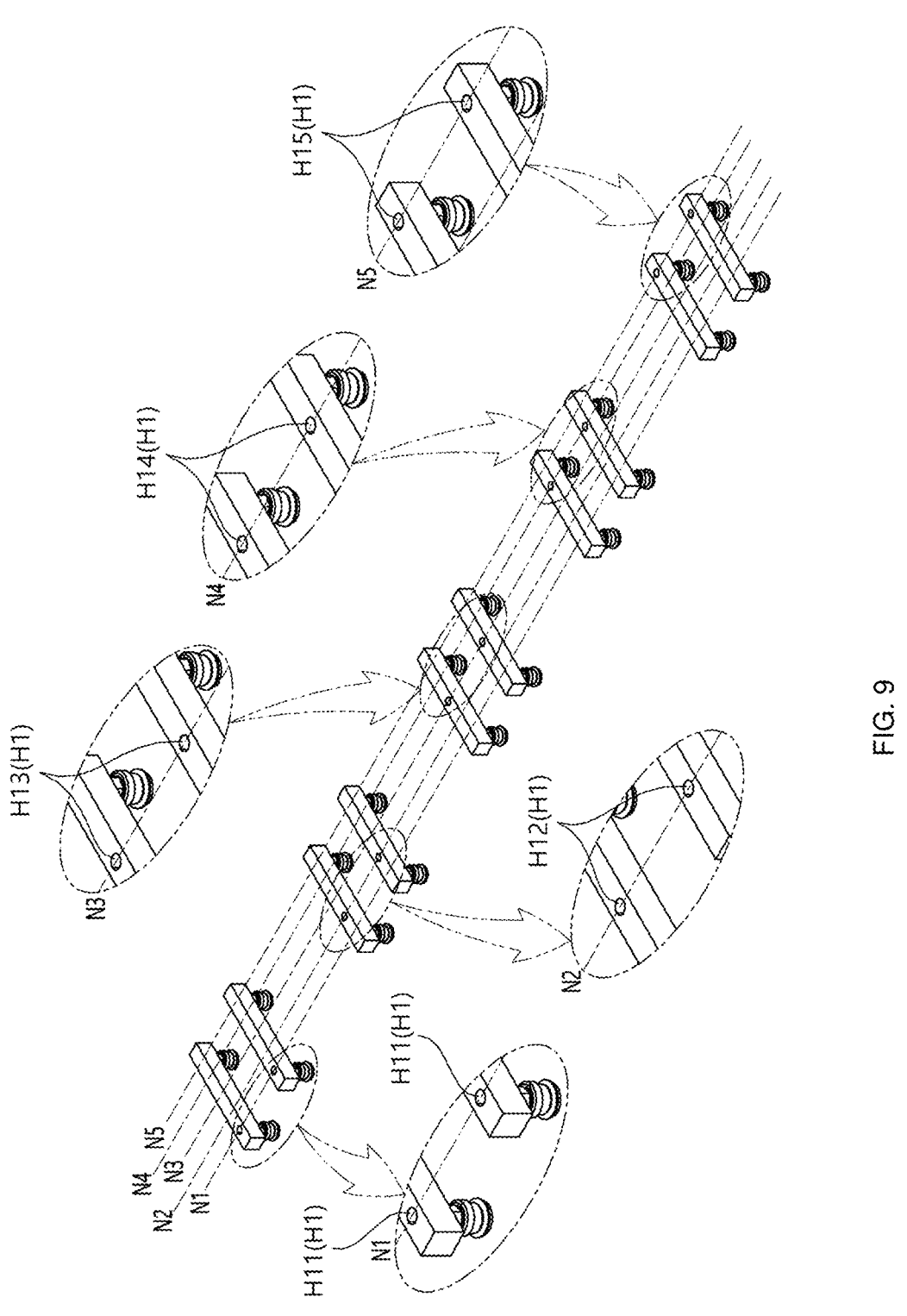
FIG. 9 is a view showing the positions of first holes of the suction blocks.

FIG. 9 is a diagram showing the positions of first holes H of the suction blocks 400.

Referring to FIG. 9, two suction blocks 400 may be paired together and hold a single sheet S of electrodes. For example, five pairs of suction blocks 400 may correspond to the loading area A21, the first inspection area A22, the first unloading area A11, the second inspection area A23, and the second unloading area A12, respectively.

The first hole H11 of any one of the sequentially arranged suction blocks 400 may be disposed in the first column N1. This first hole H11 corresponds to the second hole H21 and the first flow path U11 disposed in the first column N1. In other words, the first hole H11 disposed in the first column N1 communicates with the second hole H21 and the first flow path U11.

The first hole H12 of another one among the sequentially arranged suction blocks 400 may be disposed in the second column N2. This first hole H12 corresponds to the second hole H22 and the first flow path U12 disposed in the second column N2. In other words, the first hole H12 disposed in the second column N2 communicates with the second hole H22 and the first flow path U12.

The first hole H13 of another one among the sequentially arranged suction blocks 400 may be disposed in the third column N3. This first hole H13 corresponds to the second hole H23 and the first flow path U13 disposed in the third column N3. In other words, the first hole H13 disposed in the third column N3 communicates with the second hole H23 and the first flow path U13.

The first hole H14 of another one among the sequentially arranged suction blocks 400 may be disposed in the fourth column N4. This first hole H14 corresponds to the second hole H24 and the first flow path U14 disposed in the fourth column N4. In other words, the first hole H14 disposed in the fourth column N4 communicates with the second hole H24 and the first flow path U14.

The first hole H15 of the other one among the sequentially arranged suction blocks 400 may be disposed in the fifth column N5. This first hole H15 corresponds to the second hole H25 and the first flow path U15 disposed in the fifth column N5. In other words, the first hole H15 disposed in the fifth column N5 communicates with the second hole H25 and the first flow path U15.

Figure 10:
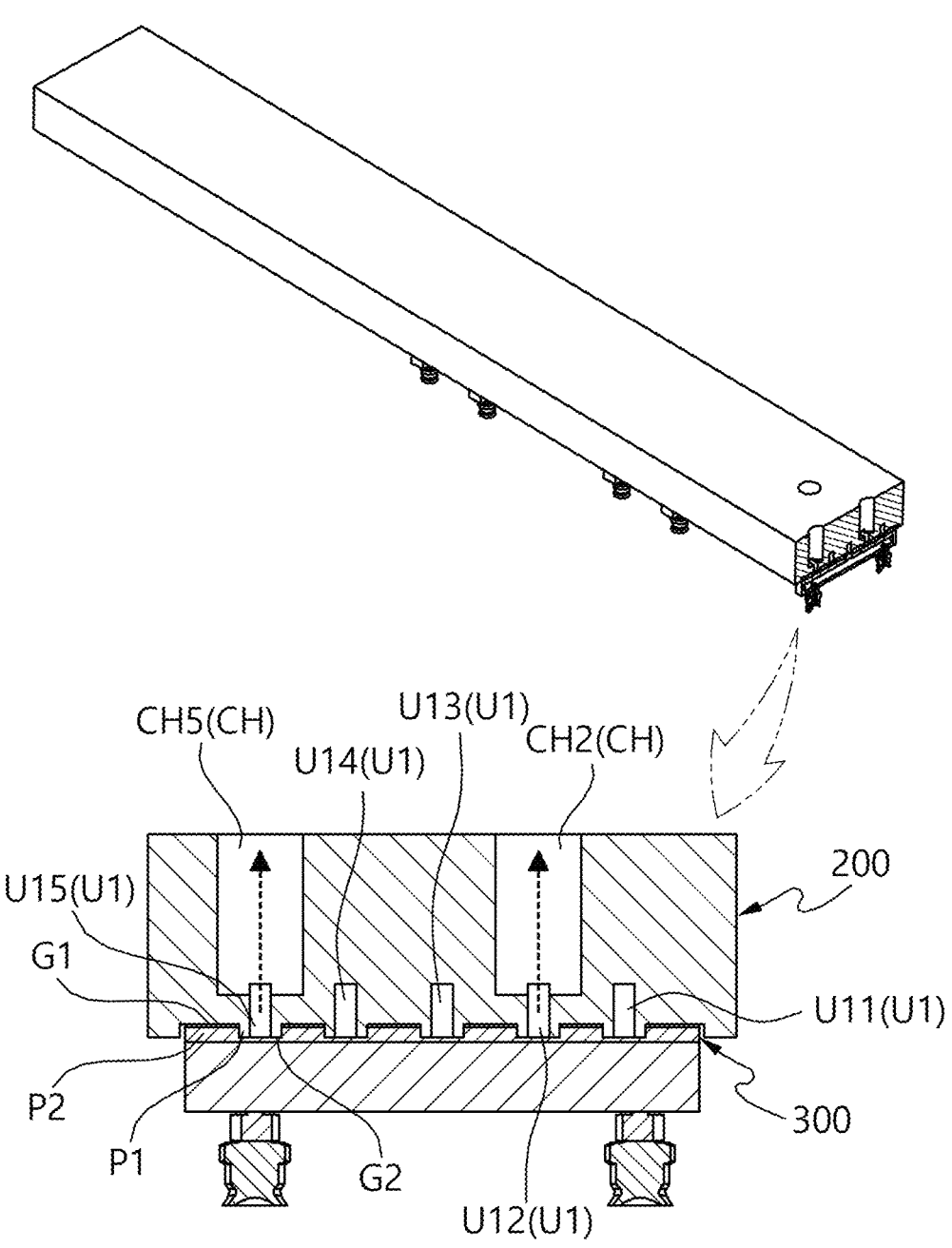
FIG. 10 is a view illustrating a state in which some connection holes of the suction plate are in communication with first flow paths.

FIG. 10 is a diagram illustrating a state in which some connection holes of the suction plate 200 are in communication with the first flow paths U1.

Referring to FIG. 10, the first protrusion P1 is positioned in the second groove G2 of the belt 300. The first groove G1 of the suction plate 200 accommodates the second protrusion P2 of the belt 300.

The suction plate 200 includes a plurality of connection holes CH. The number of connection holes CH corresponds to the number of first flow paths U1. One connection hole CH is positioned for each independently partitioned first flow path U1. These connection holes CH serve to connect the suction driving portion and the first flow paths U1 to each other.

A fifth connection hole CH5 is in communication with the first flow path U15 disposed in the fifth column N5. Additionally, a second connection hole CH2 is in communication with the first flow path U12 disposed in the second column N2.

The first flow path U12 arranged in the second column N2 is connected to the second suction unit 120 through the second connection hole CH2. Through the second suction unit 120, the suction of the suction blocks 400 connected to the first flow path U12 arranged in the second column N2 may be controlled.

The first flow path U15 arranged in the fifth column N5 is connected to the fifth suction unit 150 through a fifth connection hole CH5. Through the fifth suction unit 150, the suction of the suction blocks 400 connected to the first flow path U15 arranged in the fifth column N5 may be controlled.

Figure 11:
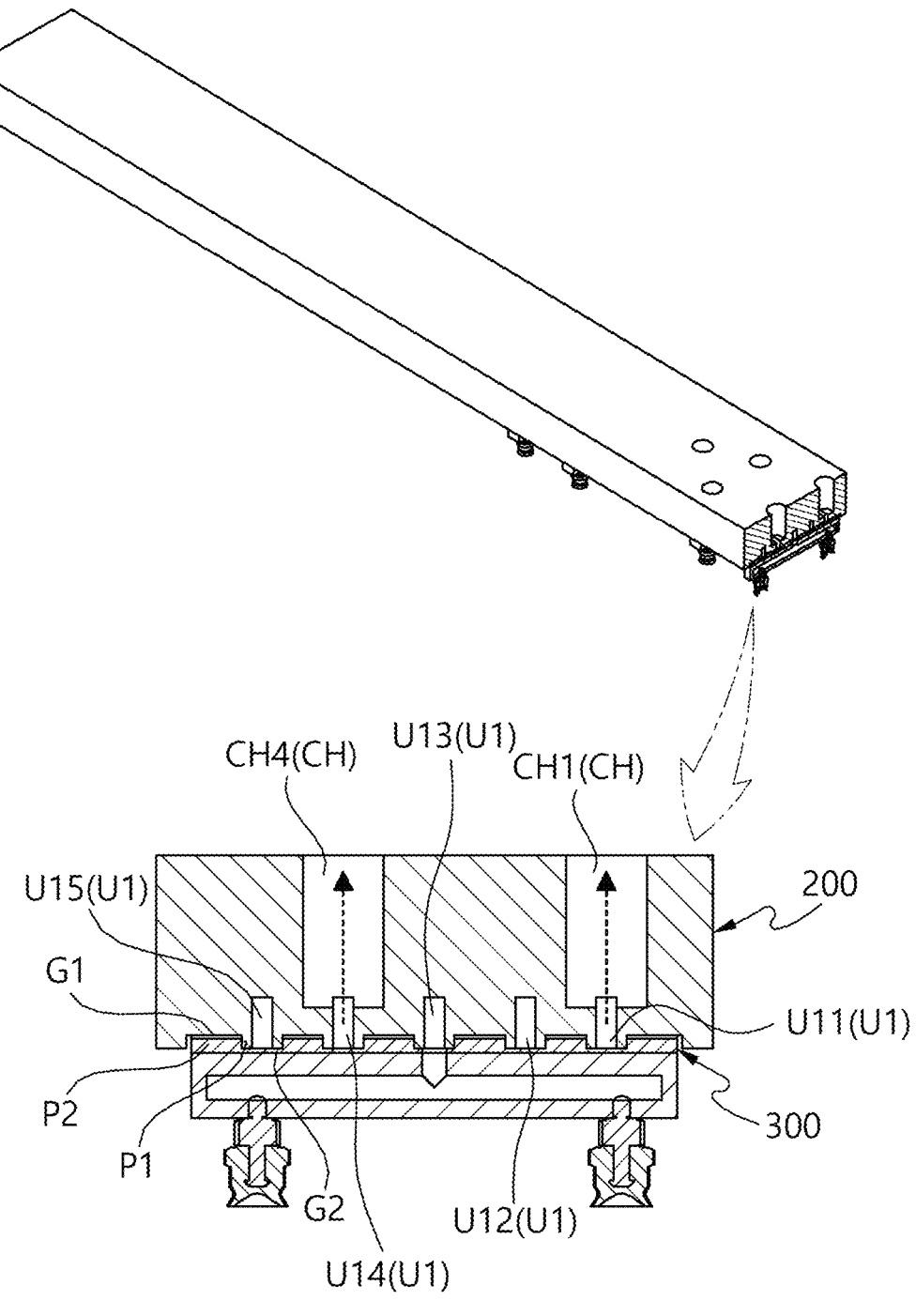
FIG. 11 is a view illustrating a state in which some connection holes of the suction plate are in communication with first flow paths.

FIG. 11 is a view illustrating a state in which some connection holes of the suction plate 200 are in communication with the first flow paths U1.

Referring to FIG. 11, a fourth connection hole CH4 is in communication with the first flow path U14 disposed in the fourth column N4. Additionally, a first connection hole CH1 is in communication with the first flow path U11 disposed in the first column N1. The first flow path U14 arranged in the fourth column N4 is connected to the fourth suction unit 140 through the fourth connection hole CH4. Through the fourth suction unit 140, the suction of the suction blocks 400 connected to the first flow path U14 arranged in the fourth column N4 may be controlled.

The first flow path U11 arranged in the first column N1 is connected to the first suction unit 110 through the first connection hole CH1. Through the first suction unit 110, the suction of the suction blocks 400 connected to the first flow path U11 arranged in the first column N1 may be controlled.

Figure 12:
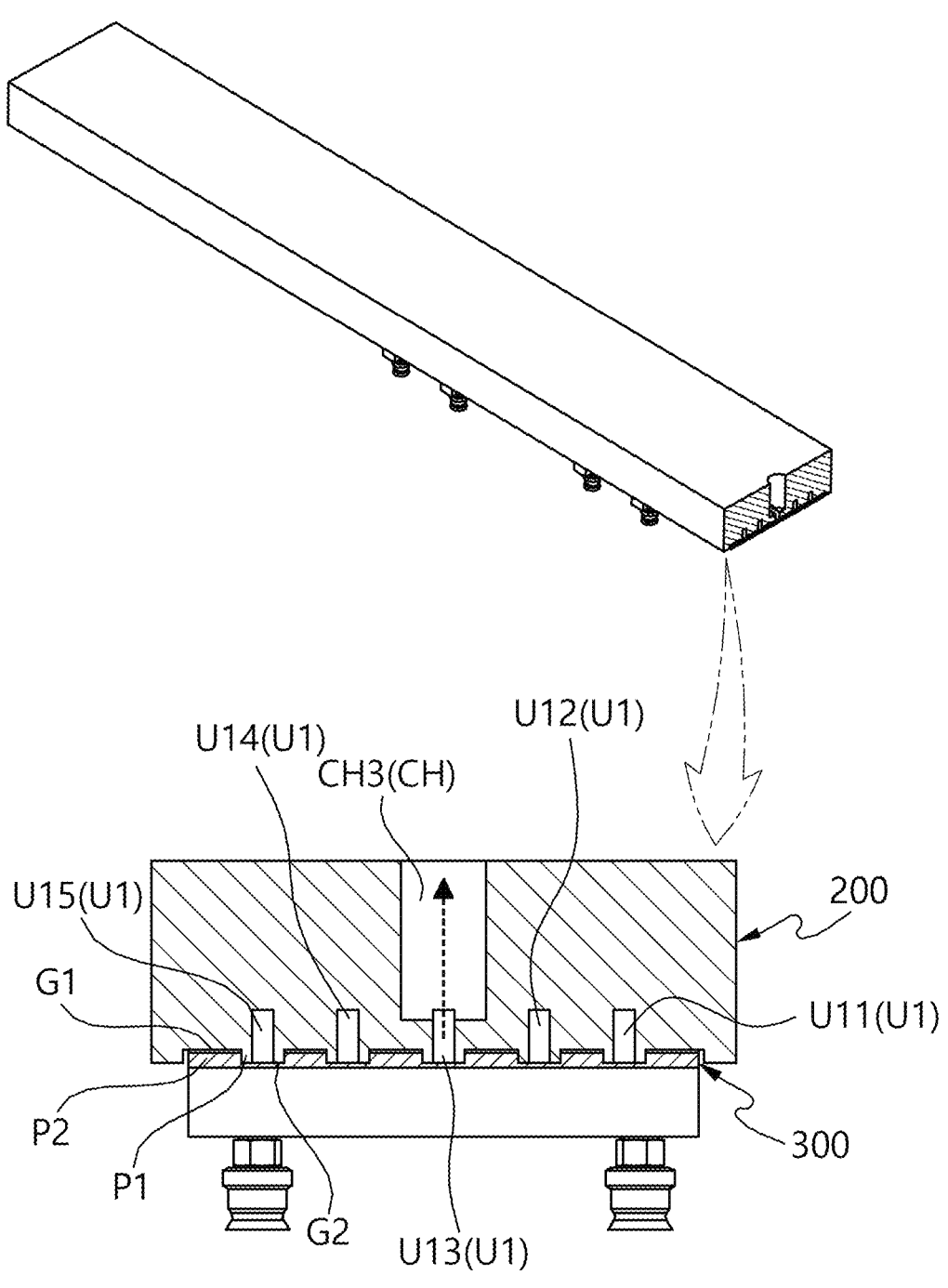
FIG. 12 is a view illustrating a state in which some connection holes of the suction plate are in communication with first flow paths.

FIG. 12 is a view illustrating a state in which some connection holes CH of the suction plate 200 are in communication with the first flow paths U1.

Referring to FIG. 12, a third connection hole CH3 is in communication with the first flow path U13 disposed in the third column N3. The first flow path U13 arranged in the third column N3 is connected to the third suction unit 130 through the third connection hole CH3. Through the third suction unit 130, the suction of the suction blocks 400 connected to the first flow path U13 arranged in the third column N3 may be controlled.

Figure 13:
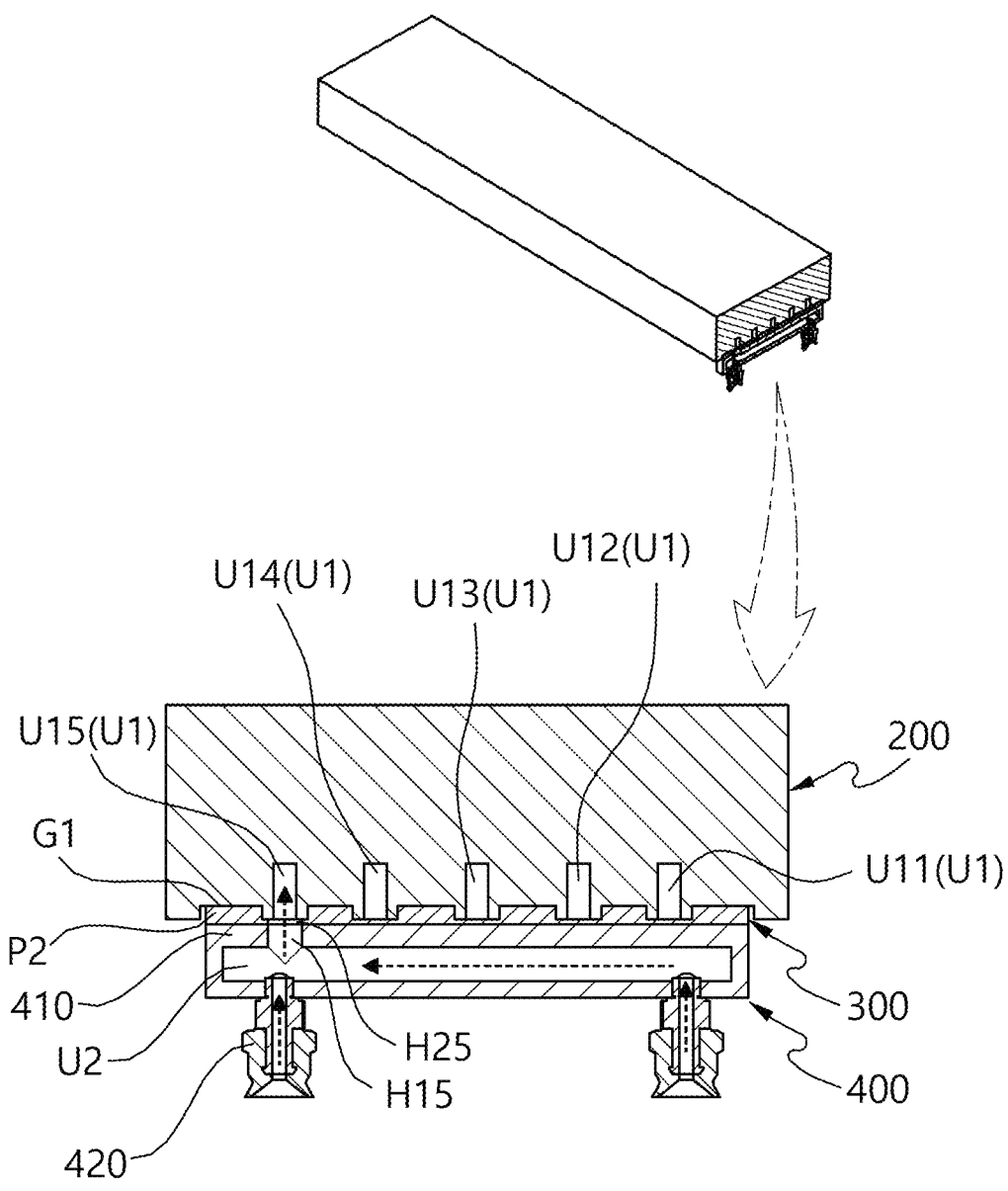
FIG. 13 is a view illustrating a state in which the suction block arranged in a fifth column is in communication with the first flow path of the suction plate.

FIG. 13 is a view illustrating a state in which the suction block 400 arranged in the fifth column N5 is in communication with the first flow path U1 of the suction plate 200.

Referring to FIG. 13, the first flow path U15 arranged in the fifth column N5 is in communication with the second hole H25 of the belt 300 disposed in the fifth column N5. Additionally, the second hole H25 of the belt 300 disposed in the fifth column N5 is in communication with the first hole H15 of the suction block 400 disposed in the fifth column N5. The first flow path U15 and the second flow path U2 communicate through the first hole H15, and ultimately the first flow path U15 and the suction tips 420 communicate with each other.

Figure 14:
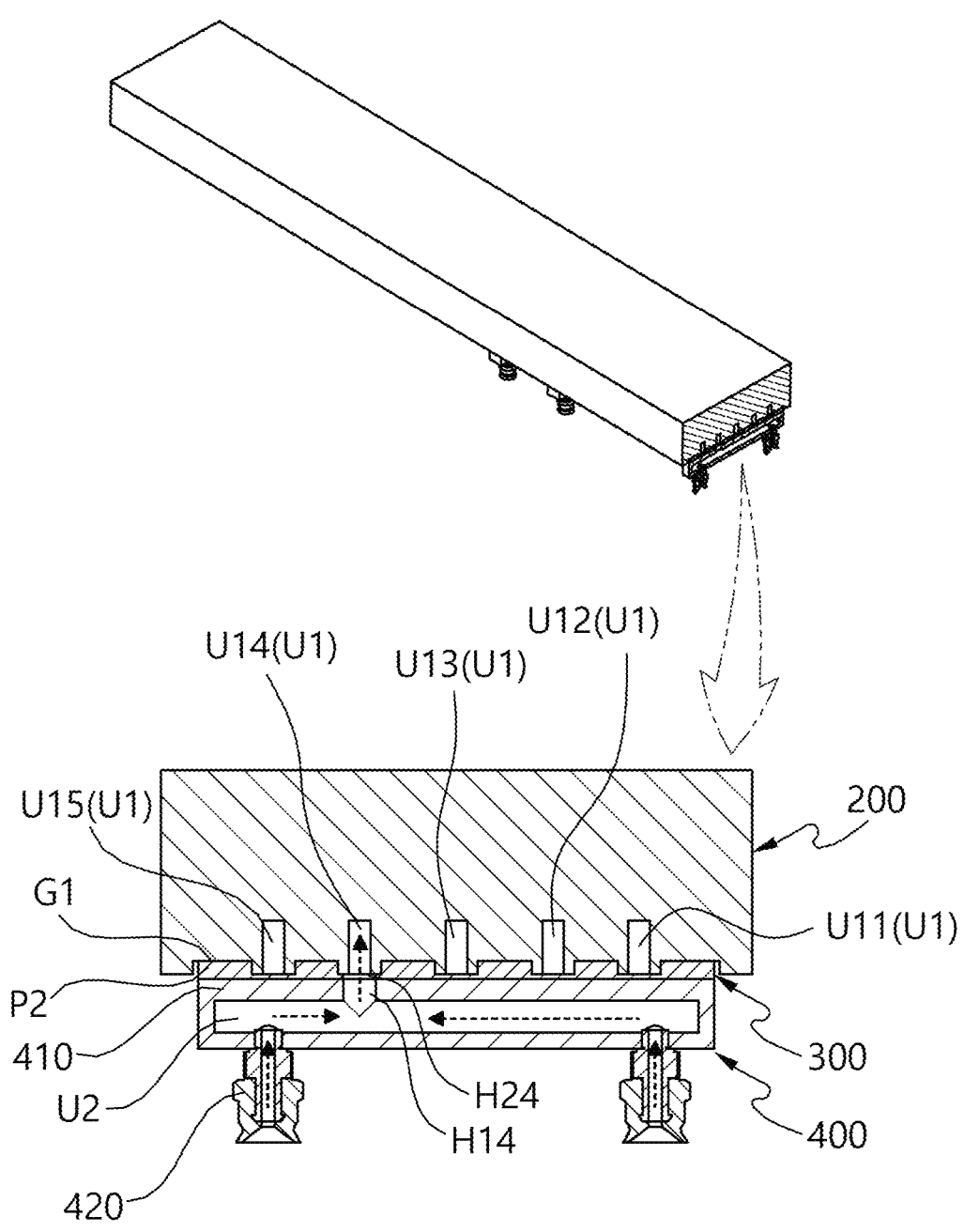
FIG. 14 is a view illustrating a state in which the suction block arranged in a fourth column is in communication with the first flow path of the suction plate.

FIG. 14 is a view illustrating a state in which the suction block 400 arranged in the fifth column N4 is in communication with the first flow path of the suction plate.

Referring to FIG. 14, the first flow path U14 arranged in the fourth column N4 communicates with the second hole H24 of the belt 300 disposed in the fourth column N4. Additionally, the second hole H24 of the belt 300 disposed in the fourth column N4 is in communication with the first hole H14 of the suction block 400 disposed in the fourth column N4. The first flow path U14 and the second flow path U2 communicate through the first hole H14, and ultimately the first flow path U14 and the suction tips 420 communicate with each other.

Although not shown in the drawings, the suction blocks 400 arranged in the first row N1, second row N2, and third row N3 are each connected to the first flow paths U1 in the same manner.

Thus, because the configurations connected to the suction blocks 400 are physically separated, the suction status of the first area A1 where the electrodes S are separated (unloaded) does not affect the suction status of the second area A2. That is, even if the electrode S is separated from the suction tips 420 and thus the suction block 400's the second flow path (U2) is opened in the first unloading area A11, the suction status of the suction block 400 in the first inspection area A22 adjacent to the first unloading area A11 or the suction status of the suction block 400 in the second inspection area A23 remains unaffected, allowing the suction status to be maintained in the first inspection area A22 and the second inspection area A23.

Meanwhile, the suction driving portion 100 may independently control each of the suction units 110, 120, 130, 140, and 150 in the first area A1.

For example, in the first unloading area A11, when the suction block 400 with the first hole H1 disposed in the third column N3 is positioned, the suction driving portion may release the suction to discharge a defective electrode S in the first unloading area A11 by controlling the suction unit 130 connected to the first flow path U13 corresponding to the third column N3.

Next, the suction driving portion 100 may sequentially control the suction unit 140 connected to the first flow path U14 corresponding to the fourth column N4 in the first unloading area A11. Subsequently, the suction driving portion 100 may control the suction unit 150 connected to the first flow path U15 corresponding to the fifth column N5 in the first unloading area A11. Then, it may control the suction unit 110 connected to the first flow path U1 corresponding to the first column N1 in the first unloading area A11. Finally, it may control the suction unit 120 connected to the first flow path U12 corresponding to the second column N2 in the first unloading area A11.

In the above, specific examples of the secondary battery electrode S production system of the present invention have been described, but it is obvious that various implementation modifications are possible within the limit not departing from the scope of the present invention.

Therefore, the scope of the present invention should not be limited to the aforementioned embodiments, but should be defined by the equivalents to the appended claims as well as the claims.

Accordingly, it should be understood that the above-described embodiments are merely exemplary and is not limited, and it should be interpreted that the scope of the present invention is represented by the claims rather than the description, and the changes or modifications derived from the claims and the equivalents thereof pertain to the scope of the present invention.

INDUSTRIAL APPLICABILITY

The present invention can be efficiently applied in the field of secondary battery manufacturing equipment.

What is claimed is:

1. A secondary battery electrode production system comprising a transfer portion configured to transfer an electrode,
   wherein the transfer portion is divided into a first area for unloading the electrode and a second area for loading or holding the electrode,
   the transfer portion comprises a suction driving portion, a suction plate, a belt moving along the suction plate, and a plurality of suction blocks coupled to the belt,
   the suction plate comprises a plurality of first flow paths partitioned from each other,
   each of the suction blocks comprises a second flow path and a first hole connected to the second flow path,
   the belt comprises a second hole aligned with the first hole, and
   among the plurality of suction blocks, the first hole of the suction block positioned in the first area communicates with any one of the plurality of first flow paths, while the first hole of the suction block positioned in the second area communicates with another one of the plurality of first flow paths.

2. The secondary battery electrode production system of claim 1, wherein the first flow paths are arranged into a plurality of columns and the first hole of the suction block positioned in the first area and the first hole of the suction block positioned in the second area are aligned and disposed in different columns of the first flow paths.

3. The secondary battery electrode production system of claim 1, wherein the suction block comprises a block body including the second flow path and the first hole, and a suction tip coupled to the block body and in contact with the electrode by communicating with the second flow path.

4. The secondary battery electrode production system of claim 1, wherein the first flow paths are arranged into a plurality of columns, the suction plate comprises an inlet connected to the suction driving portion, and the inlet is disposed in alignment with the columns.

5. The secondary battery electrode production system of claim 1, wherein the transfer portion comprising, along a moving direction of the electrode:
   a loading area for loading the electrode;
   a first inspection area for performing primary inspection on the electrode loaded in the loading area; and
   a first unloading area for discharging an electrode that has been determined to be defective in the first inspection area,
   wherein the first area corresponds to the first unloading area and the second area corresponds to the loading area and the first inspection area.

6. The secondary battery electrode production system of claim 5, wherein the transfer portion comprising:
   a second inspection area for performing secondary inspection on an electrode that is not discharged from the first unloading area; and
   a second unloading area for loading the electrode inspected in the second inspection area into a magazine,
   wherein the first area corresponds to the second unloading area and the second area corresponds to the second inspection area.

7. The secondary battery electrode production system of claim 1, wherein the first flow paths are arranged into a plurality of columns and the suction driving portion comprises a plurality of suction units that communicate, respectively, with the first flow paths disposed in the plurality of columns.

8. The secondary battery electrode production system of claim 7, wherein the suction driving portion sequentially releases suction of the plurality of suction units in the first area.

9. The secondary battery electrode production system of claim 1, wherein the suction plate comprises a plurality of first protrusion protruding from a lower surface and the first flow path is disposed on the first protrusion and is opened from the first protrusion toward the belt.

10. The secondary battery electrode production system of claim 9, wherein the belt comprises a second groove in which the second hole is disposed, the first protrusion is disposed in the second groove, and the second groove is disposed along the first flow path.

* * * * *